UNITED STATES PATENT OFFICE.

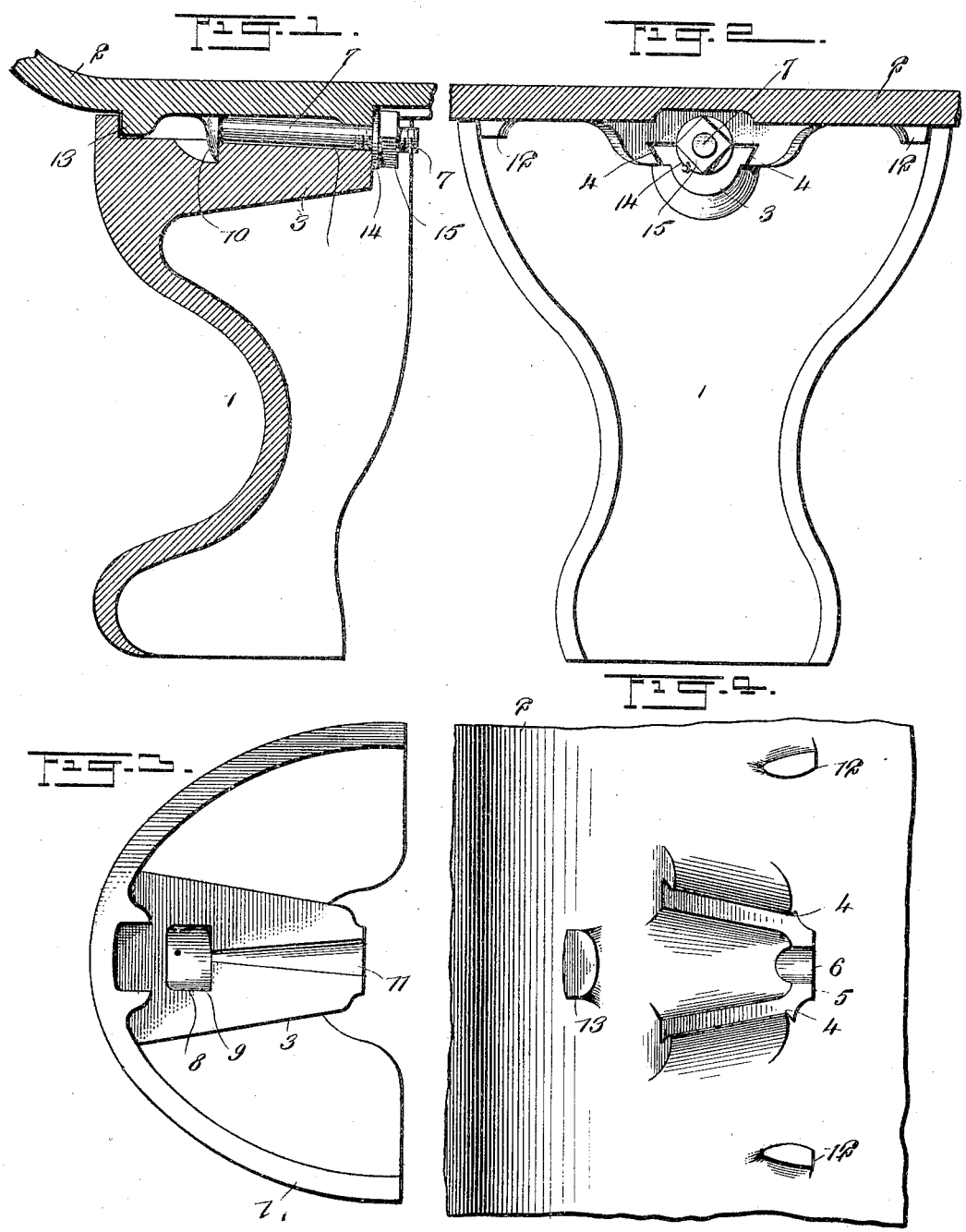

PATRICK HENRY DUNN, OF ROME, NEW YORK.

LEG-FASTENER.

SPECIFICATION forming part of Letters Patent No. 682,460, dated September 10, 1901.

Application filed June 25, 1901. Serial No. 66,034. (No model.)

*To all whom it may concern:*

Be it known that I, PATRICK HENRY DUNN, a citizen of the United States, and a resident of Rome, in the county of Oneida and State of New York, have invented a new and Improved Leg-Fastener, of which the following is a full, clear, and exact description.

This invention relates to improvements in devices for fastening legs to a bath-tub or the like; and the object is to provide a simple device whereby the legs may be rigidly fastened, yet readily removed when necessary.

I will describe a leg-fastener embodying my invention and then point out the novel features in the appended claims.

Reference is to be had to the accompanying drawings, forming a part of this specification, in which similar characters of reference indicate corresponding parts in all the figures.

Figure 1 is a sectional elevation of a leg and a portion of a bath-tub bottom, showing a fastening device embodying my invention. Fig. 2 is an inside elevation thereof. Fig. 3 is a top plan view of the leg. Fig. 4 is a bottom view of a portion of a bath-tub, and Fig. 5 is a perspective view of the fastening-bolt.

Referring to the drawings, 1 designates a cast-metal leg, and 2 a section of the bottom of a bath-tub. Extended inward from the upper portion of the leg is a wedge-shaped lug 3, which is arranged slightly below the top end of said leg. The opposite edges of this lug 3 are inclined or beveled to engage with correspondingly-shaped slideways 4, formed on the bottom of the tub. Of course these slideways will be wedge-shaped to correspond to the shape of the lug. The slideways are projected somewhat beyond the surface of the bath-tub bottom, and the ends are connected by a cross-wall 5, having a depression 6, in which about one-half the circumference of the fastening-bolt 7 may engage. The top surface of the lug 3 is provided with a recess 8, against the inner wall 9 of which the head 10 of the bolt is designed to engage, and from this recess 8 a channel 11 extends in the upper surface of the lug, the said channel gradually increasing in depth from the end connecting with the recess 8 to the opposite end. The upper portion of the bolt-head is flattened, as plainly indicated in the drawings, to engage closely against the under surface of the bath-tub bottom. Side lugs 12 on the bottom 2 engage against the inner surfaces of the leg at its upper portion at opposite sides, and a similar lug 13 on the bath-tub bottom engages against the inner surface of the leg at its outer portion.

In operation, after placing the locking-bolt 7 in the channel 11, the lug is to be slid into the slideways 4, and then a washer 14 may be placed upon the bolt to engage against the inner end of the lug 3 and against the outer surface of the cross-piece 5, as indicated in Fig. 1, after which a nut 15 is to be placed on the bolt and screwed up tight. It is obvious, however, that the washer 14 may be omitted and the nut screwed up tight against the end of the lug.

Having thus described my invention, I claim as new and desire to secure by Letters Patent—

1. In a bath-tub or the like, convergent guides arranged on the under side thereof, a leg, an inwardly-extended lug at the upper portion of the leg and having its opposite edges adapted to engage in the guides, the said lug having a recess in its upper surface near the front end, a bolt having a portion of its head adapted to engage the inner wall of said recess and to extend between the lug and the bottom of the bath-tub or the like, and a tightening-nut on the inner end of said bolt, substantially as specified.

2. In a bath-tub or the like, converging guides arranged on the bottom thereof and extended slightly beyond the center, a cross-piece connected to the inner ends thereof and having a depression, a leg, an inwardly-extended lug on said leg, the said lug being wedge-shaped and having beveled edges for engaging in the guides, the said lug also having a recess and a channel or groove extended from the recess inward, a bolt adapted to engage its head against the inner wall of said recess, the body of the bolt being received in said channel and in the depression, and a fastening-nut on the inner end of the bolt, substantially as specified.

In testimony whereof I have signed my name to this specification in the presence of two subscribing witnesses.

PATRICK HENRY DUNN.

Witnesses:
JAMES P. GUBBINS,
GEORGE HARDING.